(12) United States Patent
Tickner et al.

(10) Patent No.: US 9,334,908 B2
(45) Date of Patent: May 10, 2016

(54) CENTRIFUGAL BACKSPIN BRAKE

(71) Applicant: KUDU INTERNATIONAL INC., St. Michael Parish (BB)

(72) Inventors: Gary Tickner, Calgary (CA); Robert A.R. Mills, St. Peter Parish (BB)

(73) Assignee: KUDU INTERNATIONAL INC., St. Michael Parish (BB)

( * ) Notice: Subject to any disclaimer, the term of this patent is extended or adjusted under 35 U.S.C. 154(b) by 178 days.

(21) Appl. No.: 14/063,079

(22) Filed: Oct. 25, 2013

(65) Prior Publication Data

US 2014/0116813 A1    May 1, 2014

Related U.S. Application Data

(60) Provisional application No. 61/718,971, filed on Oct. 26, 2012.

(51) Int. Cl.
  *F16D 51/22* (2006.01)
  *F16D 51/26* (2006.01)
  *F16D 127/00* (2012.01)

(52) U.S. Cl.
  CPC ............... *F16D 51/22* (2013.01); *F16D 51/26* (2013.01); *F16D 2127/002* (2013.01)

(58) Field of Classification Search
  USPC .................. 188/67, 72.9, 82.77, 184, 185
  See application file for complete search history.

(56) References Cited

U.S. PATENT DOCUMENTS

| | | | | |
|---|---|---|---|---|
| 1,689,913 A | * | 10/1928 | Carrey | 192/105 BA |
| 1,749,624 A | * | 3/1930 | Batson | 188/323 |
| 2,268,605 A | * | 1/1942 | Mattersdorf | 188/362 |
| 2,495,082 A | * | 1/1950 | Weinheimer, Sr. | 192/217.6 |
| 2,547,864 A | * | 4/1951 | Hall | 192/217.6 |
| 2,754,698 A | * | 7/1956 | Federkiel | 475/314 |
| 2,851,893 A | * | 9/1958 | Putz | 474/13 |
| 2,896,912 A | * | 7/1959 | Faugier et al. | 242/381.6 |
| 2,970,680 A | * | 2/1961 | Cain | 192/105 CD |
| 3,170,549 A | * | 2/1965 | Baker, III | 192/217.6 |
| 3,388,617 A | * | 6/1968 | Nelson | 475/260 |
| 3,393,781 A | * | 7/1968 | Atsutami | 192/65 |
| 3,432,013 A | * | 3/1969 | Matsumoto | 192/217.4 |

(Continued)

FOREIGN PATENT DOCUMENTS

| | | |
|---|---|---|
| CA | 2074013 | 1/1994 |
| CA | 2171899 | 10/1996 |
| CA | 2311036 | 12/2001 |

*Primary Examiner* — Robert A Siconolfi
*Assistant Examiner* — James Hsiao
(74) *Attorney, Agent, or Firm* — Duane Morris LLP; Gregory M. Lefkowitz

(57) ABSTRACT

A centrifugal brake system for retarding shaft backspin includes a brake drum, a brake hub attachable to the shaft and two or more brake shoes mounted on the hub for braking engagement with the drum. A mechanical linkage transfers the generated braking force from the brake shoes to the hub and permits radial displacement of the brake shoes relative to the hub, upon rotational shifting of the hub relative to the brake shoes between deactivated and activated positions. In the deactivated position of the hub, the brake shoes are maintained in a radially inward, disengaged position. In the activated position, the brake shoes are radially displaceable by centrifugal force from the disengaged position to a radially outward, engaged position, wherein the brake shoes are in braking engagement. The rotational shifting of the hub is achieved through frictional drag between the brake shoes and the brake drum.

18 Claims, 15 Drawing Sheets

(56) References Cited

U.S. PATENT DOCUMENTS

| | | | |
|---|---|---|---|
| 3,557,922 A * | 1/1971 | Schwerdhoffer | 192/64 |
| 3,576,242 A * | 4/1971 | Mumma | 193/35 A |
| 3,645,363 A * | 2/1972 | Fuths | 188/184 |
| 3,696,901 A * | 10/1972 | Henry | 192/105 BA |
| 4,035,994 A * | 7/1977 | Hoff | 56/11.3 |
| 4,044,533 A * | 8/1977 | Wick | 56/11.3 |
| 4,134,481 A * | 1/1979 | Calderazzo | 192/217.1 |
| 4,152,881 A * | 5/1979 | Hoff | 56/11.3 |
| 4,158,307 A * | 6/1979 | Schwager | 73/535 |
| 4,216,848 A * | 8/1980 | Shimodaira | 188/71.2 |
| 4,254,641 A * | 3/1981 | Gauer et al. | 68/23.7 |
| 4,277,936 A * | 7/1981 | Hoff | 56/11.7 |
| 4,446,954 A * | 5/1984 | Weiss | 192/105 CD |
| 4,582,179 A * | 4/1986 | Nelson | 188/184 |
| 4,797,075 A | 1/1989 | Edwards et al. | |
| 4,856,623 A * | 8/1989 | Romig, Jr. | 188/180 |
| 4,913,371 A * | 4/1990 | Margetts | 242/383.5 |
| 4,981,200 A * | 1/1991 | Gee | 188/341 |
| 4,993,276 A | 2/1991 | Edwards | |
| 5,280,828 A * | 1/1994 | Reynoso et al. | 188/184 |
| 5,358,036 A | 10/1994 | Mills | |
| 5,503,261 A * | 4/1996 | Schultz | 192/105 CD |
| 5,535,855 A * | 7/1996 | Hanada | 188/24.14 |
| 5,551,510 A * | 9/1996 | Mills | 166/68 |
| 6,041,894 A * | 3/2000 | Otterson et al. | 188/19 |
| 6,079,489 A * | 6/2000 | Hult et al. | 166/68.5 |
| 6,290,028 B1 * | 9/2001 | Liu | 188/26 |
| 7,077,249 B2 * | 7/2006 | Lu et al. | 188/325 |
| 7,168,533 B2 * | 1/2007 | Podratzky | 188/185 |
| 8,727,090 B2 * | 5/2014 | Yang | 192/35 |
| 8,851,235 B2 * | 10/2014 | Allington et al. | 182/234 |
| 2006/0263220 A1 * | 11/2006 | Russ | 416/147 |
| 2006/0278484 A1 * | 12/2006 | Antolovic | 188/323 |
| 2007/0080033 A1 * | 4/2007 | Kowatsch | 188/184 |
| 2008/0296011 A1 * | 12/2008 | Hult | 166/75.11 |
| 2010/0012444 A1 * | 1/2010 | Flodin et al. | 188/78 |
| 2011/0313607 A1 * | 12/2011 | Checketts et al. | 701/22 |
| 2012/0248233 A1 * | 10/2012 | Saito et al. | 242/289 |
| 2013/0313054 A1 * | 11/2013 | Polito et al. | 188/78 |
| 2014/0069724 A1 * | 3/2014 | Amsellem | 175/57 |
| 2014/0262643 A1 * | 9/2014 | Dettloff et al. | 188/251 R |

* cited by examiner

CENTRIFUGAL BACKSPIN BRAKE

CROSS REFERENCE TO RELATED APPLICATION

The present application claims priority to U.S. Provisional Application Ser. No. 61/718,971, entitled Centrifugal Backspin Brake, filed Oct. 26, 2012, the contents of which are incorporated herein by reference in their entirety.

FIELD OF THE INVENTION

The present invention relates to safety brake assemblies and, in particular, to safety brake assemblies for drive strings, which store reactive torque by reason of being under torsion.

BACKGROUND OF THE INVENTION

Certain drive systems are subject to torsional stresses which are stored as reactive torque in a drive train. When drive power to the system is interrupted, the reactive torque is released as backspin and, if an uncontrolled release of torque occurs, personal injury and/or property damage can result. For example, deep well submersible pumps such as progressing cavity pumps driven by sucker rod strings are commonly used to pump oil from deep wells. The drive strings for these submersible pumps usually have a relatively small diameter of ¾ to 1⅛ inches. Such drive strings are commonly used in wells that vary from 1,500' to 6,000' in depth, 3,000' being a common average.

Progressing cavity pumps include a stator, which is attached to a production tubing at the bottom of a well, and a rotor which is attached to a bottom end of the drive string. Due to the rotational resistance of the pump and the weight of the fluid being pumped, the drive sting is torsionally deformed. Progressing cavity pumps are frequently used to pump viscous crude oil, which is often laden with sand or other impurities. As a result, the elongated drive string is subject to considerable torsional force. This torsional force is stored in the elongated drive string as reactive torque. In a 3,000 foot string, as many as several hundreds of revolutions of torsion can be stored in the string if viscous sand laden crude oil is being pumped. The deeper the well and the heavier the liquid being pumped, the larger the torsional force. Upon release, the larger the torsional force, the faster the backspin. Excessive backspin speeds will occur unless a backspin braking system is used to maintain the backspin speed below a safe limit while absorbing and dissipating the energy. The safe speed is determined by the speed rating of the drive head, the power transmission system, or the prime mover.

Commonly, pulleys and belts are used to transmit power from the prime mover to the drive head. If pulleys rotate fast enough, such as during uncontrolled backspin, they will shatter due to tensile stresses in the rim resulting from centrifugal forces. Fragments from shattered sheaves are very dangerous to operating personnel. This is particularly true if an electric motor is used as a power source because such motors offer almost no resistance to reverse rotation.

Brakes which simply prevent the release of reactive torque stored in the drive string are unsatisfactory for two reasons. First, it is preferable that in the case of an electric motor drive, the motor be able to restart unattended when power is restored. In order to ensure a successful unattended restart, the motor must start without load. If the reactive torque in the drive string is not released prior to restart, the motor may not be capable of restarting and the motor may be damaged as a result. Second, if pump repair or replacement is required any unreleased torque in the drive string can be extremely dangerous for unaware workmen. Severe personal injury can result from the unintentional release of reactive torque in such drive strings.

Consequently, braking systems have been developed in an effort to prevent overspeed rotation of the shaft. Centrifugal as well as fluid brake systems are known for backspin control.

Fluid brake systems include a pump engaged only during backspin, which pump circulates hydraulic fluid or lubricating oil from a reservoir to a bearing case through a restricted orifice or valve. The resistance of the fluid created by the restriction serves to control the release of reactive torque. In other fluid brake systems, the circulated fluid is used only during backspin to operate a disc brake mounted on the shaft (see U.S. Pat. No. 5,358,036 by Mills). Fluid brake systems have the disadvantage that the stored energy dissipated by the brake heats the fluid and, thus, may break down the fluid, damage seals and degenerate the lubricating quality of the fluid, which may damage bearings and gears in the pump or the brake system. Of course, leakage of the fluid may lead to catastrophic failure of the system.

U.S. Pat. No. 4,797,075 by Edwards et al. describes a centrifugal brake system including a plurality of circumferentially distributed and leaf spring mounted brake shoes. The centrifugal force acting on the brake shoes overcomes the resetting force of the leaf spring at excessive rotation speeds. However, the brake is not unidirectional and fatigue in the leaf springs may lead to the brake being at least partially engaged even during forward rotation. Moreover, very cold temperatures may lead to excess stiffness of the leaf springs and consequently excessive speeds of the shaft. Other centrifugal brake systems are disclosed in U.S. No. 4,216,848 of Toyohisa Shiomdaira, and U.S. Pat. No. 4,993,276 of Edwards.

U.S. Pat. No. 6,079,489 by Edwards discloses another type of centrifugal brake mechanism which acts on a brake housing to provide a backspin retarder. The housing serves as a stationary brake member. The mechanism has weighted movable brake members, which are spring biased toward an inner inactive or disabled position, and which, during forward rotation of the drive shaft, are mechanically locked in the inner position. During reverse rotation of the drive shaft, the brake members are unlocked and permitted to move radially outwardly under the influence of the centrifugal force to engage with the brake housing. In addition, cams are provided for urging the movable brake members during reverse rotation into more intimate contact with the brake housing.

U.S. Pat. No. 6,079,489 by Hult et al. and US2008/0296011 disclose further centrifugal brake systems wherein the brake shoes are spring biased towards a disengaged position and moved to an active, braking position by the centrifugal force and movable cams. In this type of centrifugal braking system, the biasing of the movable brake members toward the inner disabled position reduces the maximum braking force achievable and requires the use of the additional cam members. However, the use of additional mechanical parts may increase manufacturing costs and increase the chance of mechanical failure. Also, the use of cams may lead to the brake locking up which is undesirable whenever the stored reactive torque in a shaft is to be completely released. Thus, an improved centrifugal brake system, more particularly a backspin braking system is desired which overcomes at least one of the disadvantages of prior art systems and can preferably be incorporated into the drive head of a progressing cavity pump.

SUMMARY OF THE INVENTION

In one embodiment of the invention, a centrifugal brake system for retarding backspin of a shaft is provided, which includes a brake drum for mounting in a stationary supporting structure concentrical with the shaft, a hub attachable to the shaft for co-rotation with the shaft concentrically in the brake housing and two or more brake shoes distributed circumferentially about the hub and mounted on the hub for selective braking engagement with the brake drum. The selective braking engagement is achieved with a pivot pin positioned in each brake shoe and engaging a pin slot provided in the brake hub for each brake shoe. The mechanical interaction between the pivot pin and the pin slot transfers the braking force generated by the braking engagement from the brake shoes to the hub and, thus, the shaft. The pivot pin is movably received in the pin slot for allowing the pivot pin to move in the pin slot between deactivated and activated positions, whereby the pin slot is shaped for maintaining the brake shoe in a radially inward, disengaged position when the pivot pin is in the deactivated position and for permitting the brake shoe to move to a radially outward, engaged position wherein the brake shoe is in braking engagement with the brake drum, when the pivot pin is in the activated position. Movement of the pivot pin in the pin slot is achieved through frictional drag between the brake shoe and the brake drum. For generating that frictional drag, each brake shoe has first and second ends located on opposite sides of the pin slot, the brake shoe is pivotable about the pivot pin and a biasing means is provided for each brake shoe for pivoting the brake shoe about the pivot pin and biasing the first end of the brake shoe against the brake housing to generate friction between the brake shoe and the drum. The resulting frictional drag causes a rotational shift between the hub and the brake shoe whereby the pivot pin moves along the pin slot into the deactivated position upon rotation of the shaft in a forward direction and into the activated position upon rotation of the shaft in a backwards direction. The biasing means is preferably a spring mounted between the hub and the brake shoe. The spring is preferably either a compression spring connected to the brake shoe at the first end, or a tension spring connected to the brake shoe at the second end.

In a preferred embodiment, the brake system further includes a counterbiasing structure for counteracting, at elevated forward rotation speeds of the shaft, the biasing of the first end of the brake shoe and for pivoting the first end away from the brake drum. Preferably, the counterbiasing means is a counterweight attached to the brake shoe. Most preferably, the counterweight is connected to the second end when the spring is a compression spring and to the first end when the spring is a tension spring.

The pin slot is preferably shaped as a curved slot with a radius of curvature concentrical with a wall of the brake drum and at the second end has a radially outward enlargement for receiving the pivot pin. Most preferably, the pin slot maintains the brake shoe at a distance A from the brake drum when the pivot pin is in the first position and the enlargement has a radial depth at least equal to A.

In another preferred embodiment, the brake system further includes a backstop for each brake shoe for limiting the pivoting of the first end away from the brake drum to prevent engagement of the second end with the brake drum when the pivot pin is in the first position. Preferably, the backstop is a tab mounted to the brake shoe for engagement with a shoulder on the hub, most preferably a tab mounted to the first end of the brake shoe for engagement with a shoulder on the hub. Thus, the backstop prevents the shoe from dragging on the counterweighted side of the shoe during fast forward speeds.

The invention also provides a method for retarding backspin of a rotatable shaft in a brake system having a stationary brake drum concentrical with the shaft, a hub mounted on the shaft for co-rotation with the shaft in the brake drum and two or more brake shoes distributed circumferentially evenly about the hub and pivotally mounted on the hub, which method includes the steps of pivoting each brake shoe on the hub for biasing an end of the brake shoe against the brake drum for generating a frictional drag between the brake shoe and the brake drum; and using the frictional drag for shifting the brake shoes relative to the hub between a radially inward, disengaged position wherein the brake shoe is not in braking engagement with the brake housing, and a radially outward, engaged position wherein the brake shoe is in braking engagement with the brake drum.

Preferably, the method includes the further step of creating a counterbalancing force for pivoting the end of the brake shoe away from the brake housing at elevated forward rotation speeds of the shaft. More preferably, the method includes the further step of limiting the pivoting of the first end under the influence of the counterbalancing force away from the brake drum to prevent engagement of the second end with brake drum when the brake shoe is in the disengaged position.

BRIEF DESCRIPTION OF THE DRAWINGS

The invention will now be further described by way of exemplary embodiments only and with reference to the attached drawings, wherein

FIG. 3b is an axial cross-sectional view through the backspin brake of FIG. 3 taken along line A-A in FIG. 3a;

FIG. 4b is a top plan view of only the hub and brake shoes shown in FIG. 4a;

DETAILED DESCRIPTION OF PREFERRED EMBODIMENTS

The backspin brake assembly in accordance with the invention is useful for controlling the backspin of elongated drive strings which store reactive torque due to torsional stress, such as the sucker rod strings used to drive submersible down hole pumps. The brake assembly is not limited to that application and may be used in conjunction with any shaft which transmits reactive torque that must be safely and controllably released. For purposes of illustration only, the brake assembly in accordance with the invention is described in conjunction with a mounting suitable for use with a sucker rod string typically used to drive a submersible downhole pump such as a progressive cavity pump.

Figure 1:
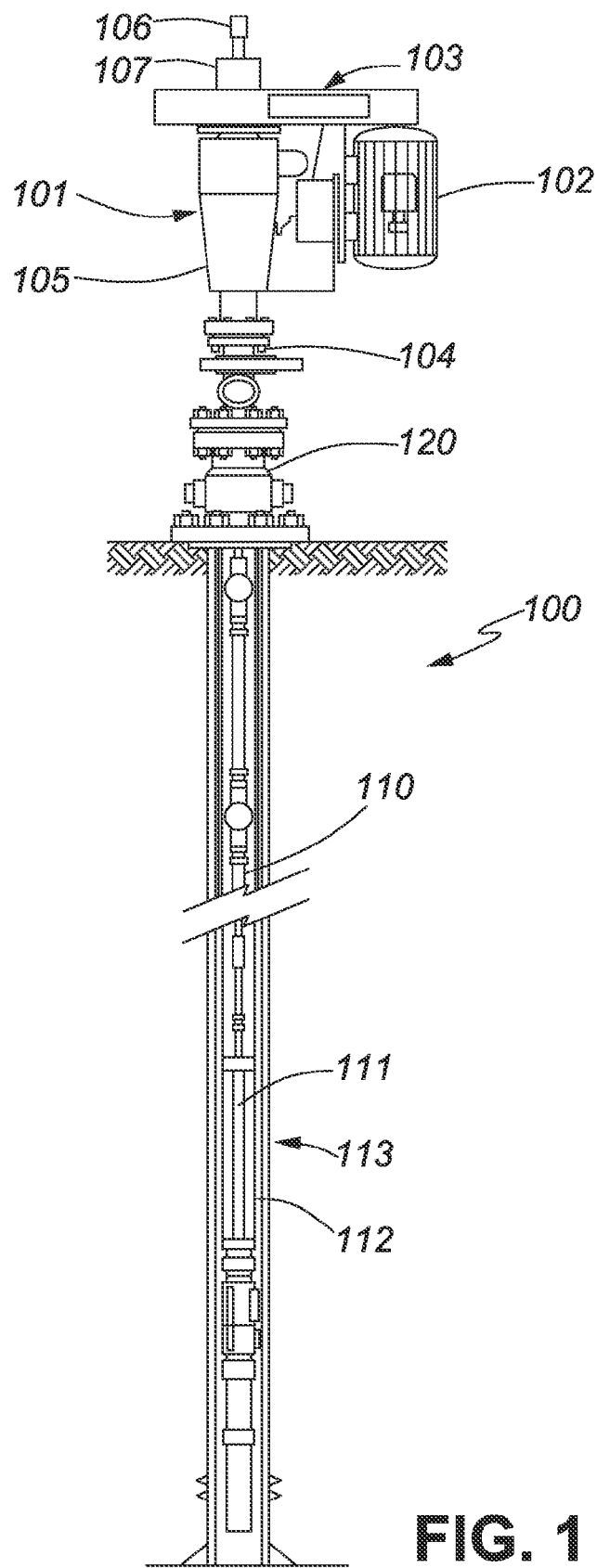
FIG. 1 shows a commonly known PCP pump arrangement with a bearing housing in the drive head which includes a backspin brake in accordance with the invention.

FIG. 1 illustrates a commonly used progressive cavity pump (PCP) installation 100 including a drive head 101, a prime mover 102, such as an electric motor, and a belt and sheave drive system 103, all of which are mounted on a blow out preventor 104 mounted on a wellhead 120. The drive head 101 supports and drives a polished rod 106 supported and rotated by means of a polished rod clamp 107. The polished rod 106 drives a rod string 110, which in turn, drives a rotor 111 inside a stator 112 of the PCP 113. As seen from FIG. 2, the polished rod clamp 107 engages an output shaft 109 of the drive head 102 by means of a shaped seat 108 in a top end of the output shaft 109. The output shaft 109 is rotatably supported in a bearing housing 105 by way of top and bottom radial bearings 121, 122. The bearing housing 105 is part of the drive head 101 and is attached to a top end of the blow out preventer 104. The weight of the sucker rod string 110 supported on the output shaft 109 through polished rod clamp 107 is transferred into the bearing housing 105 by way of a thrust bearing 124. The electric motor 102 is controlled by a control panel 114 generally known in the art. The stator 112 of the PCP 113 is connected to the production tubing 115 which extends into a wellbore. Casing 116 is cemented into the wellbore drilled in the formation 117 and is provided with perforations 118 for fluidically connecting the wellbore with the producing formation 117. The distance between a top of the wellhead 106 and fluid inside an annulus 119 between the production tubing 115 and the casing 116 is called the fluid level.

In operation, the output shaft 109 in the drive head 101 rotates in a forward direction until the prime mover 102 is shut off. Torque applied into the rod string 110 by the prime mover 102 during forward rotation causes the rod string 110 to store elastic energy in the form of torsional energy. Additional energy is stored in the form of potential energy in the produced fluid due to the difference between a fluid height at the wellhead drive 102 and the fluid level in the annulus 119 between the production tubing 115 and the casing 116. As soon as the prime mover 102 is shut off, torque input into the rod string ceases and the stored torsional energy causes the rod string 110 to stop and commence to spin backward. Due to the high amount of torsional energy stored with deep well arrangements, the backspin speed will increase rapidly to excessive speeds if not retarded or inhibited by a braking arrangement. Further, as the fluid level equalizes between the annulus 119 and the inside of the tubing string 115, the fluid drives the pump rotor 111 in reverse and additional energy is imparted into the rod string 110. Generally a backspin brake is built into the wellhead drive 102 to retard the backspin speed and absorb and dissipate the stored energy. The present invention is directed toward a braking system which is suited to retard the backspin of any rotating shaft, but is particularly suited for use in the drive head 101 of a PCP installation as shown in FIG. 1.

Figure 2:
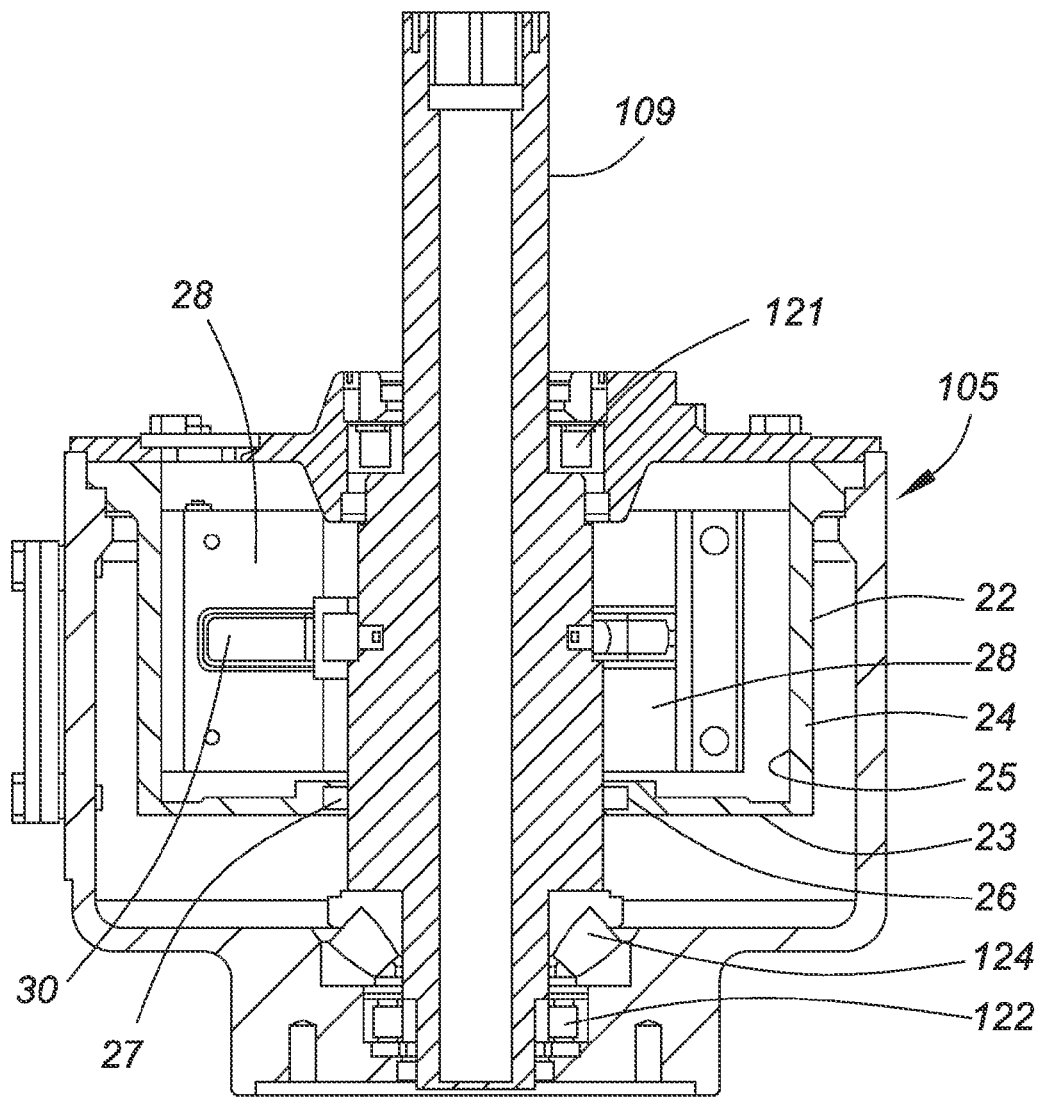
FIG. 2 is an axial cross-sectional view of the bearing housing of a PCP pump drive head shown in FIG. 1 including a backspin brake system according to the invention.

As shown in FIG. 2, which illustrates an axial cross-sectional view of the bearing housing 105 of a PCP pump drive head as shown in FIG. 1, a backspin brake system according to the invention is preferably incorporated into the bearing housing 105 of the output shaft of a conventional drive head 101 as shown in FIG. 1. The backspin brake includes a brake drum 22 mounted stationary in the bearing housing 105 concentrical with the shaft and a pair of brake shoes 28 for frictional engagement with the drum. The brake drum 22 has a base 23 and circumferential wall 24 with an interior braking surface 25 for engagement by the brake shoes 28. The base 23 has a central opening 26 for receiving the output shaft 109 and a radial seal 27 for sealing the brake drum from the interior of the bearing housing 105, which may be filled with lubricant. The brake drum 22 may also be filled with lubricant, but is preferably dry to increase the degree of friction achievable between the brake shoes 28 and the brake drum 22. A brake hub 30 is attached to the output shaft 109 for co-rotation with the shaft concentrically in the brake drum 22. Two or more brake shoes 28 may be provided which are equidistantly distributed circumferentially about the brake hub 30 and connected with the brake hub 30 for rotation therewith and for selective braking engagement with the brake drum 22.

Figure 3:
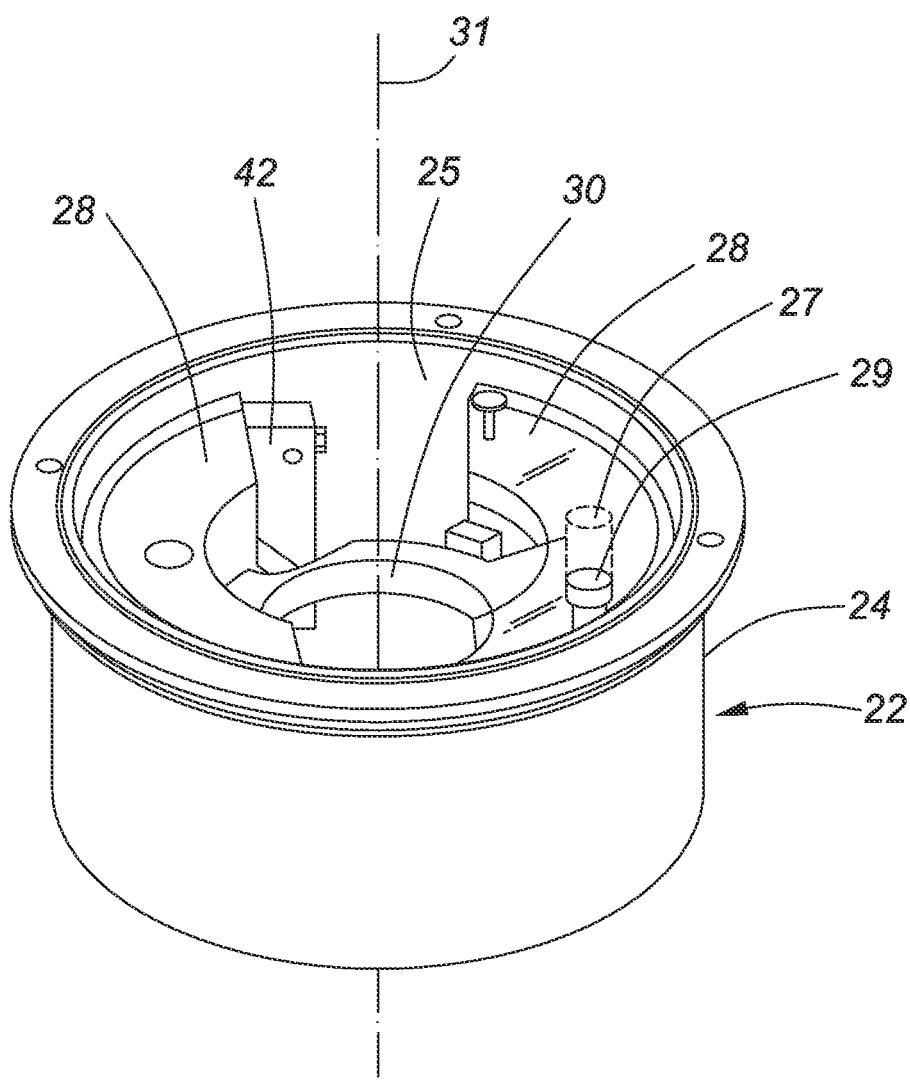
FIG. 3 is a top perspective view of a backspin brake in accordance with the invention.
Figure 3A:
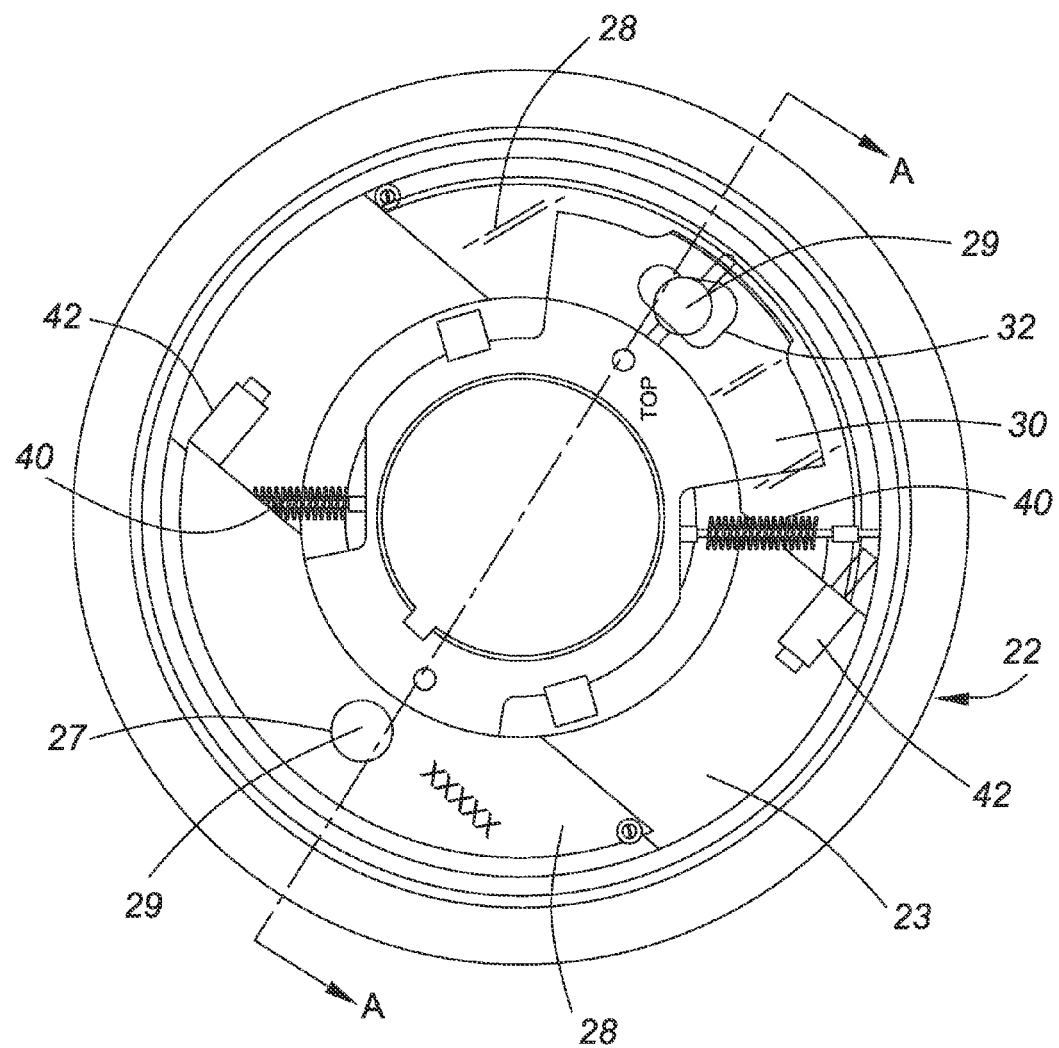
FIG. 3a is a top view of the backspin brake of FIG. 3 with one of the brake shoes shown partially in transparent view.
Figure 3B:
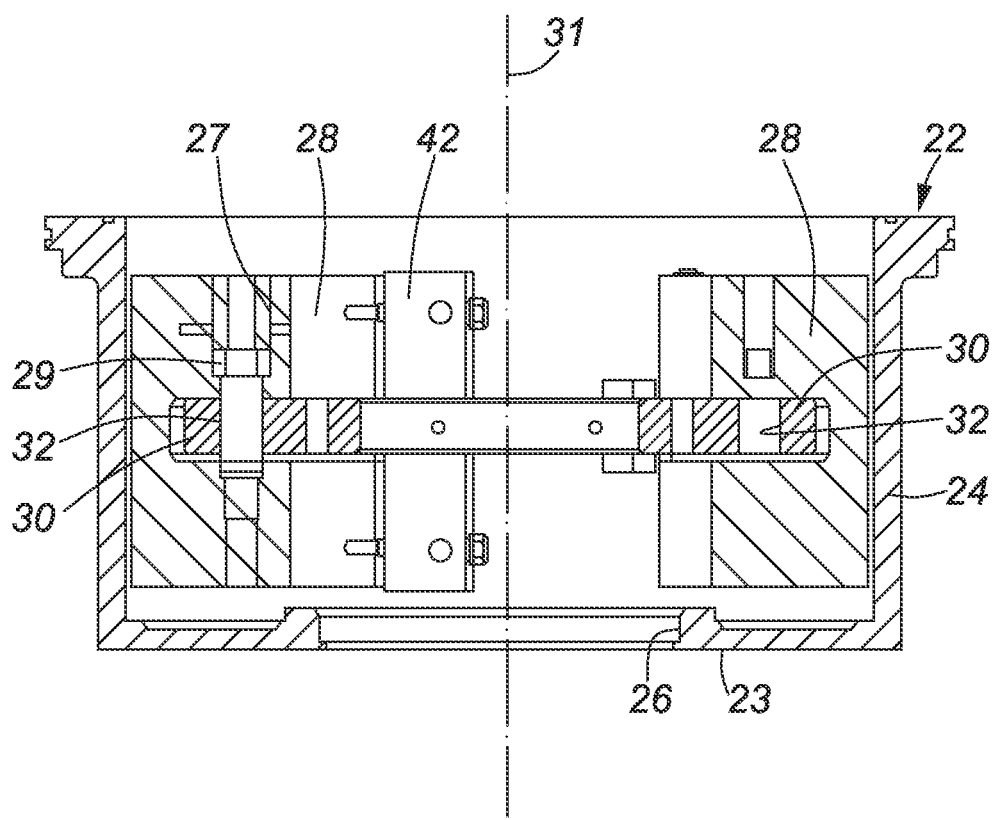
Figure 4A:
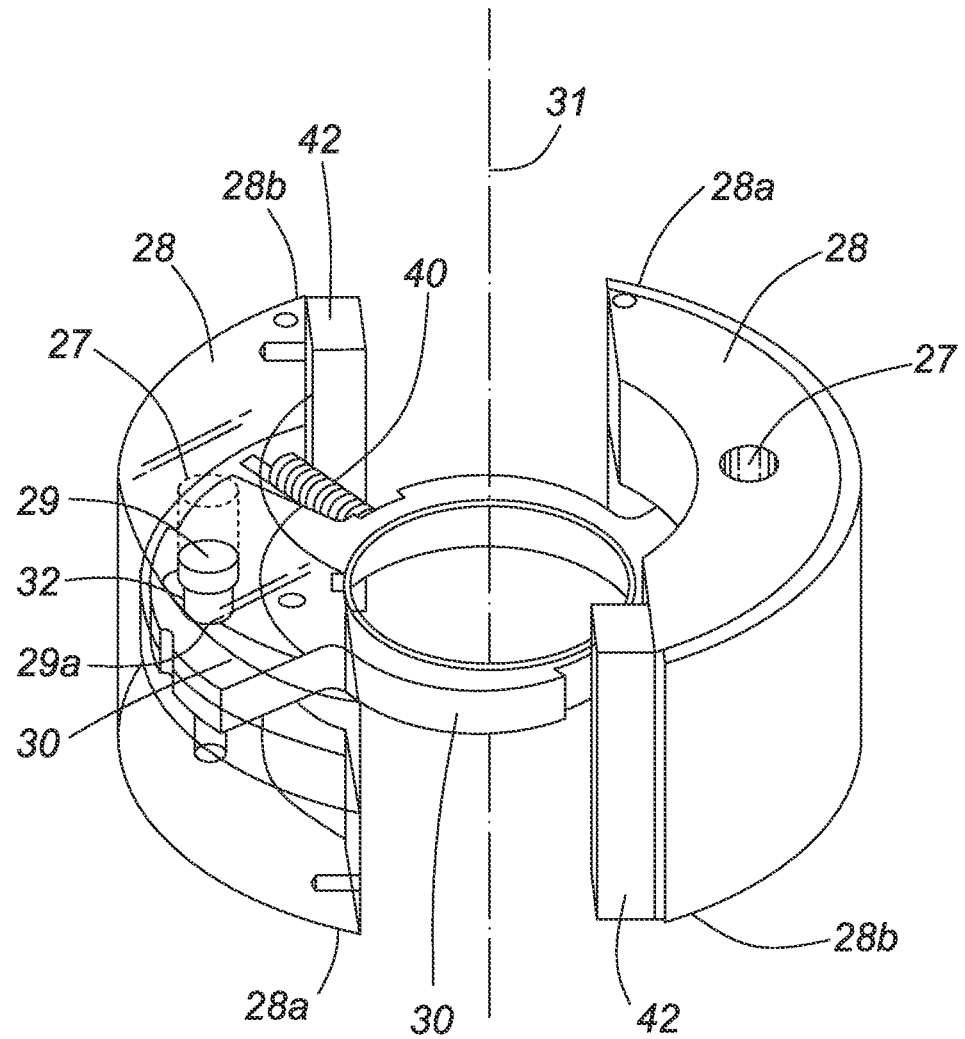
FIG. 4a is a top perspective view of only the hub and brake shoes of the backspin brake of FIG. 3 with the brake shoe illustrated on the left being shown in transparent view.
Figure 4B:
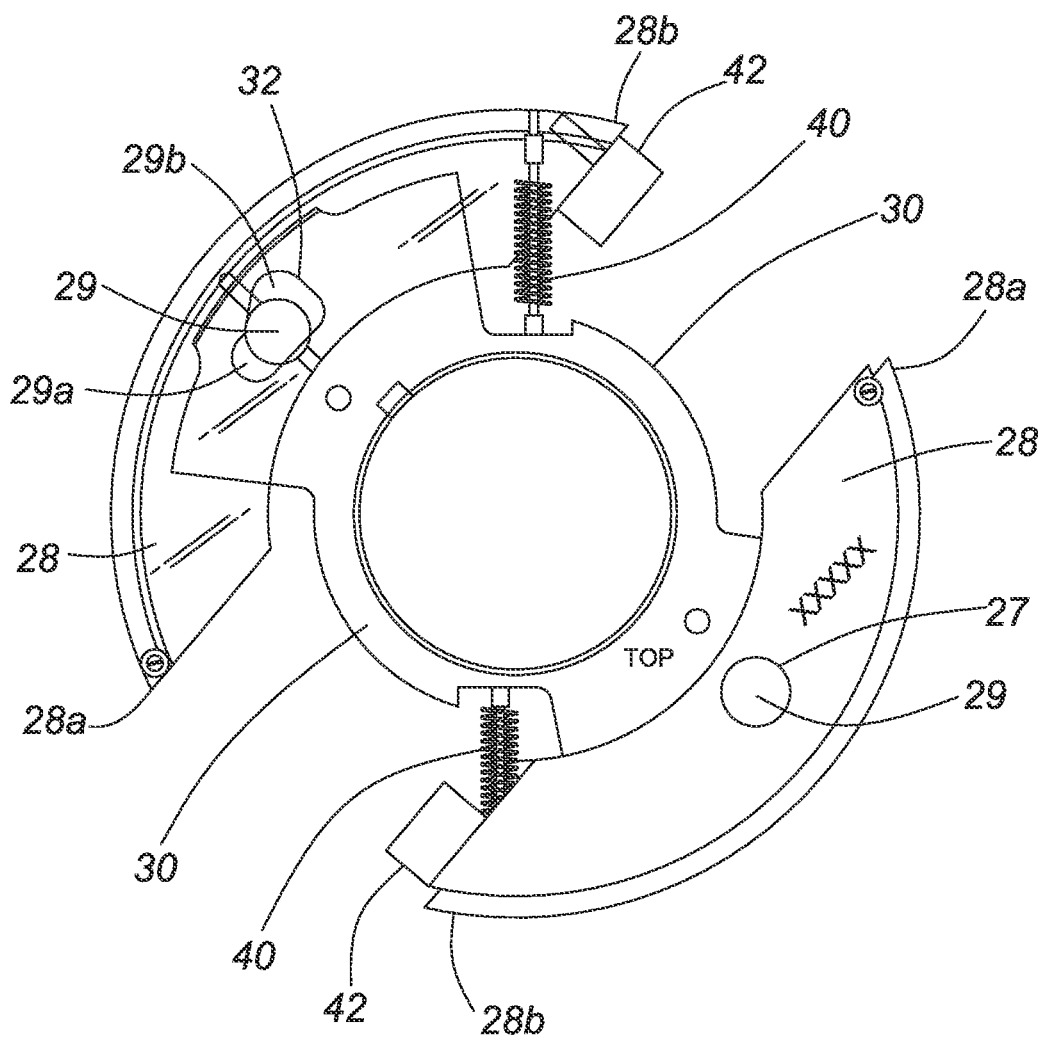
Figure 4C:
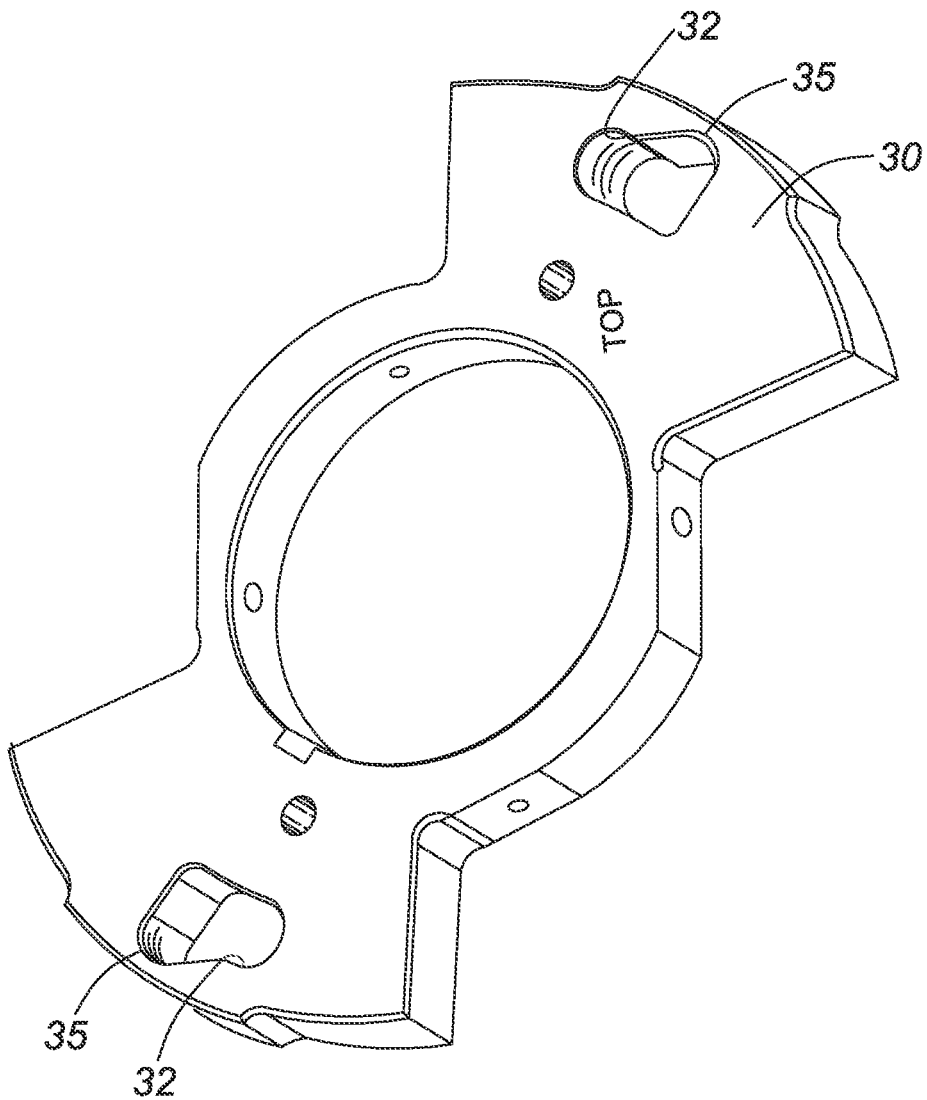
FIG. 4c is a perspective view of the hub of FIG. 4a shown in isolation.
Figure 4D:
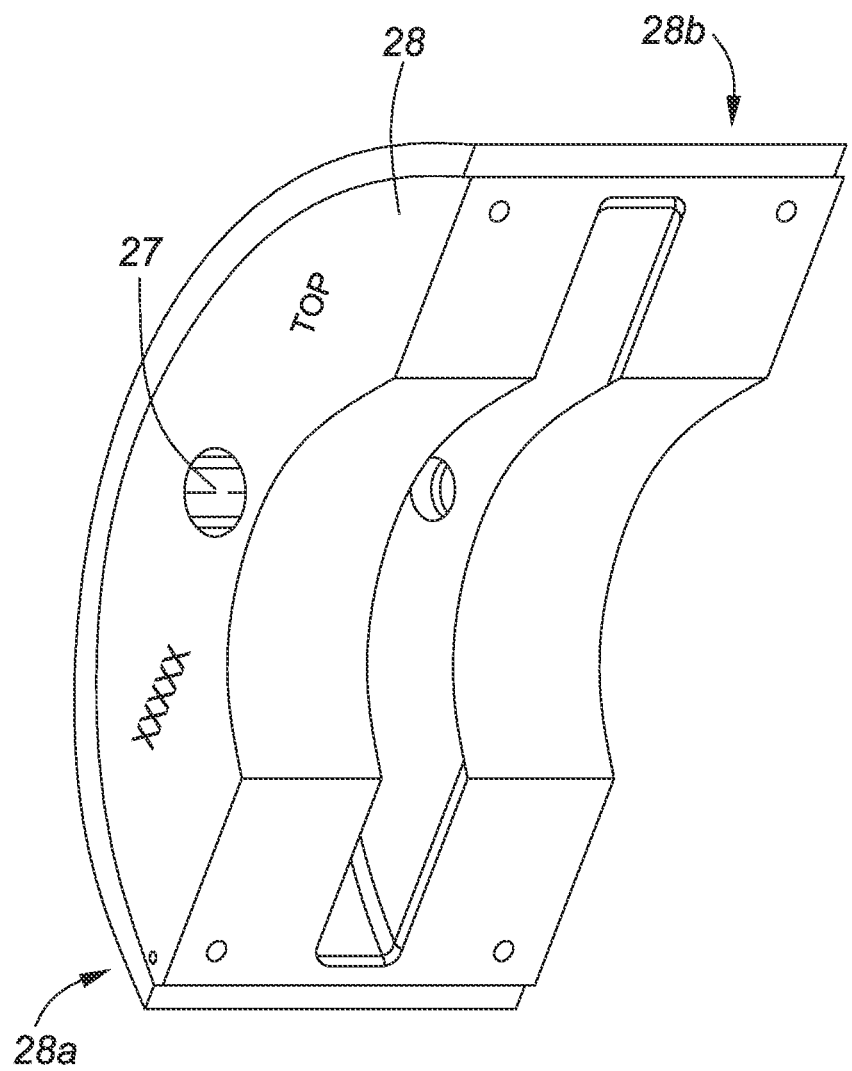
FIG. 4d is a perspective view of the brake shoe of FIG. 4a shown in isolation.
Figure 5:
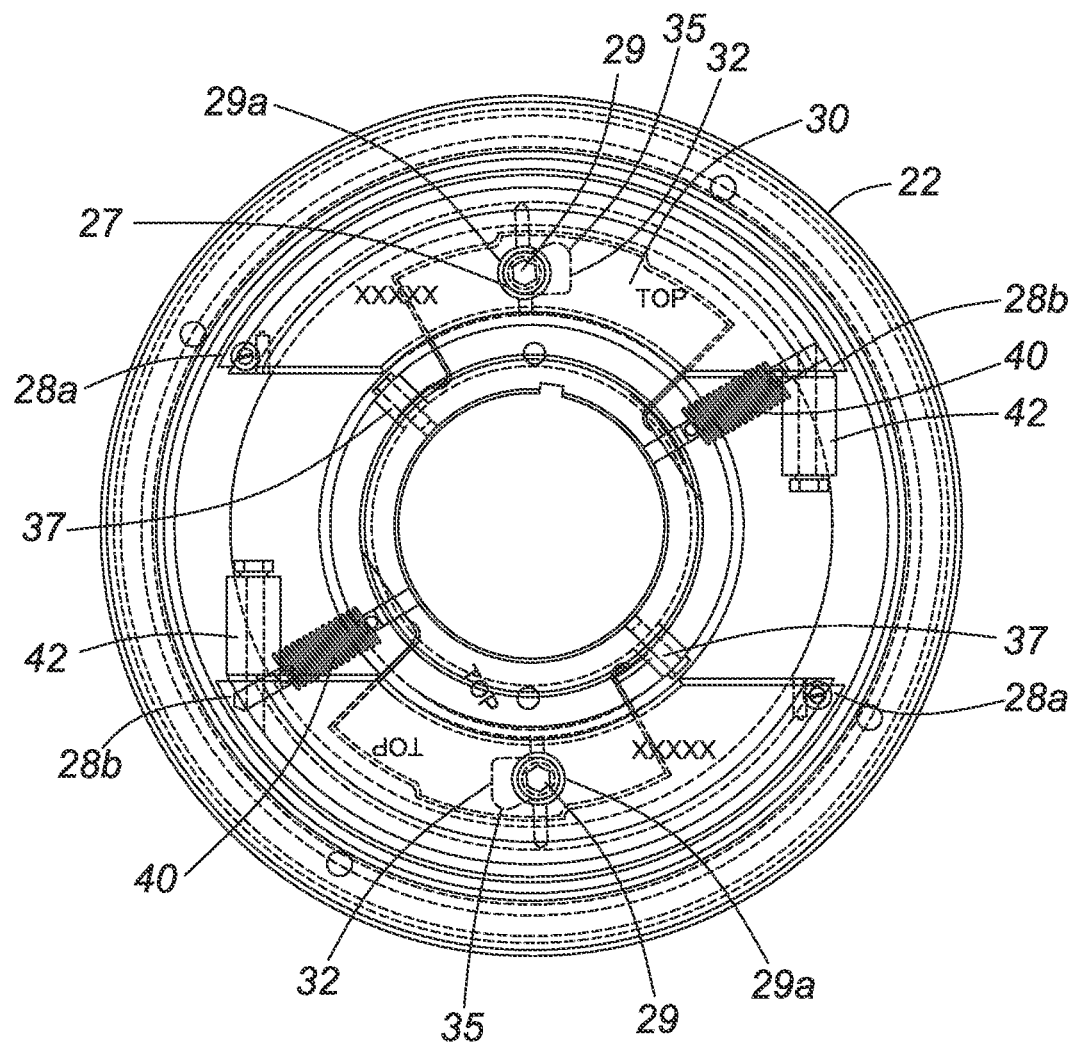
FIG. 5 is a top view of the brake of FIG. 3 in the disengaged position and showing the brake shoes in transparent outline.
Figure 6:
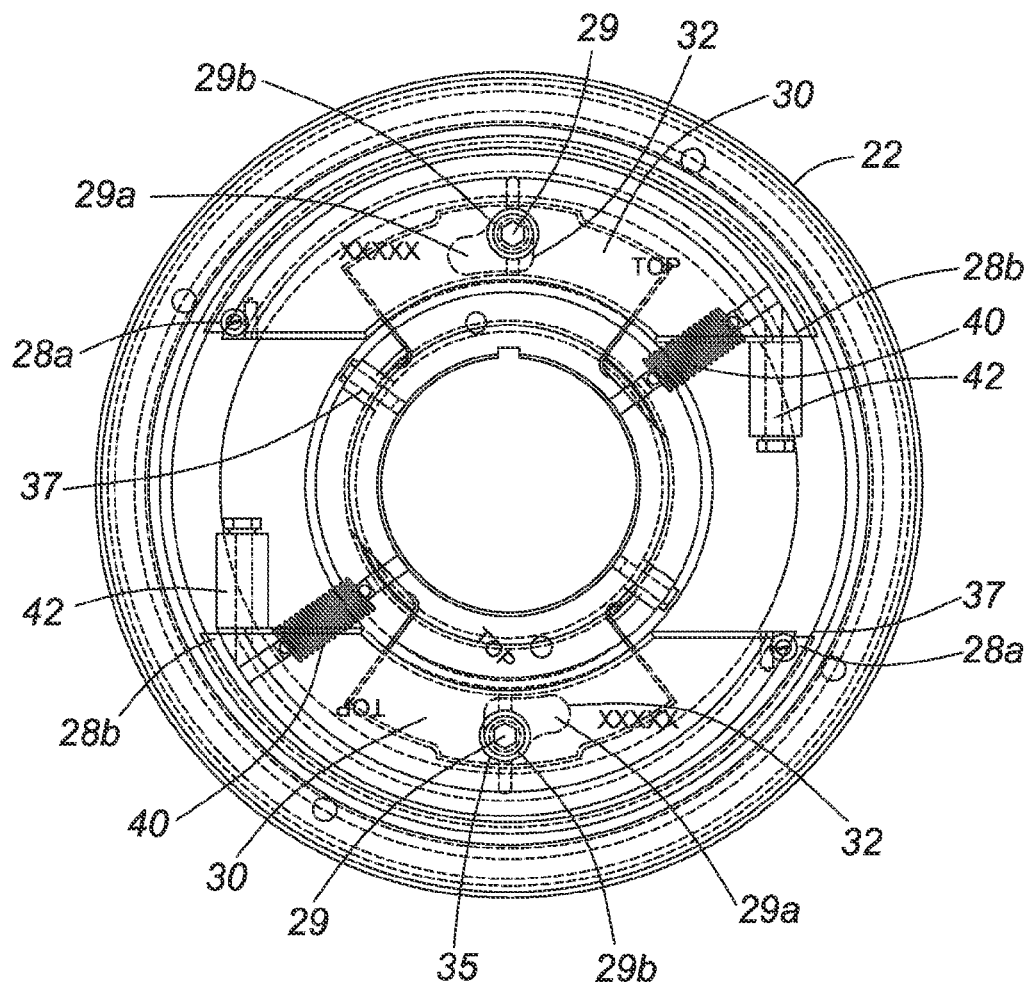
FIG. 6 is a top view of the brake of FIG. 3 in the engaged position and showing the brake shoes in transparent outline.
Figure 7:
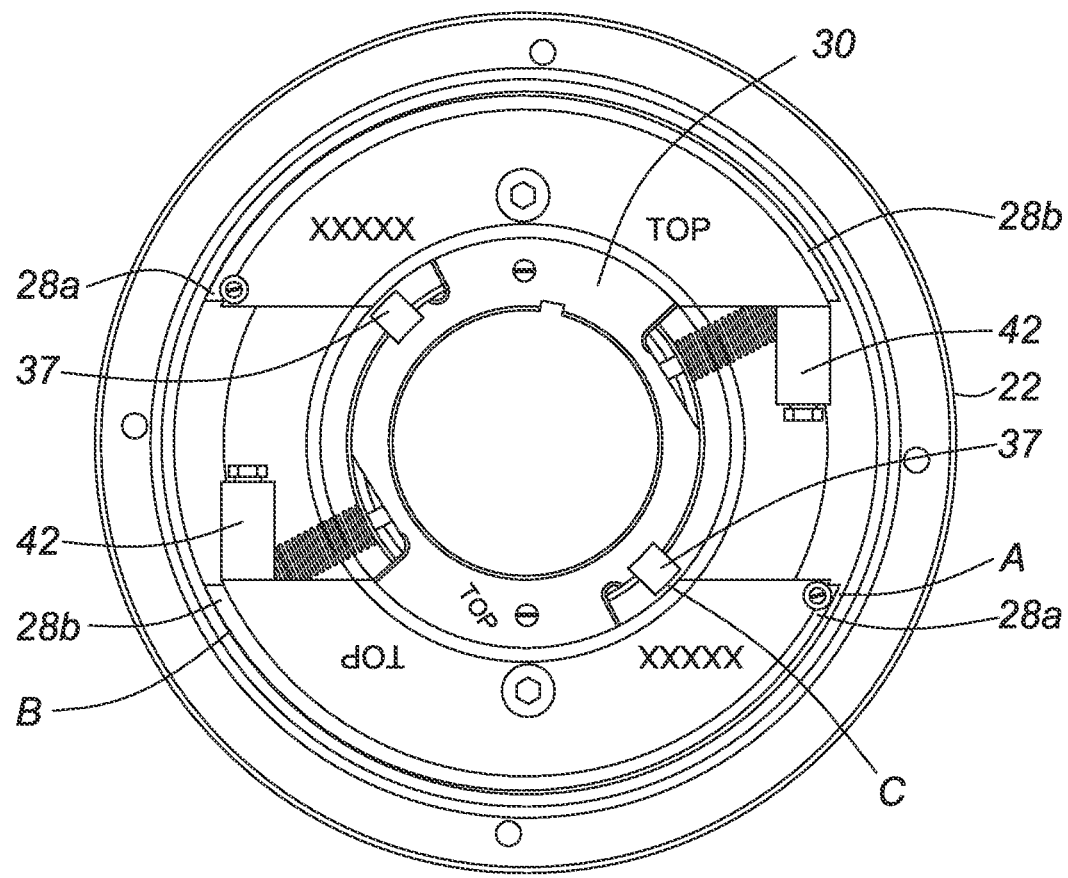
FIG. 7 is a top view of the brake of FIG. 3 during forward slow rotation.
Figure 8:
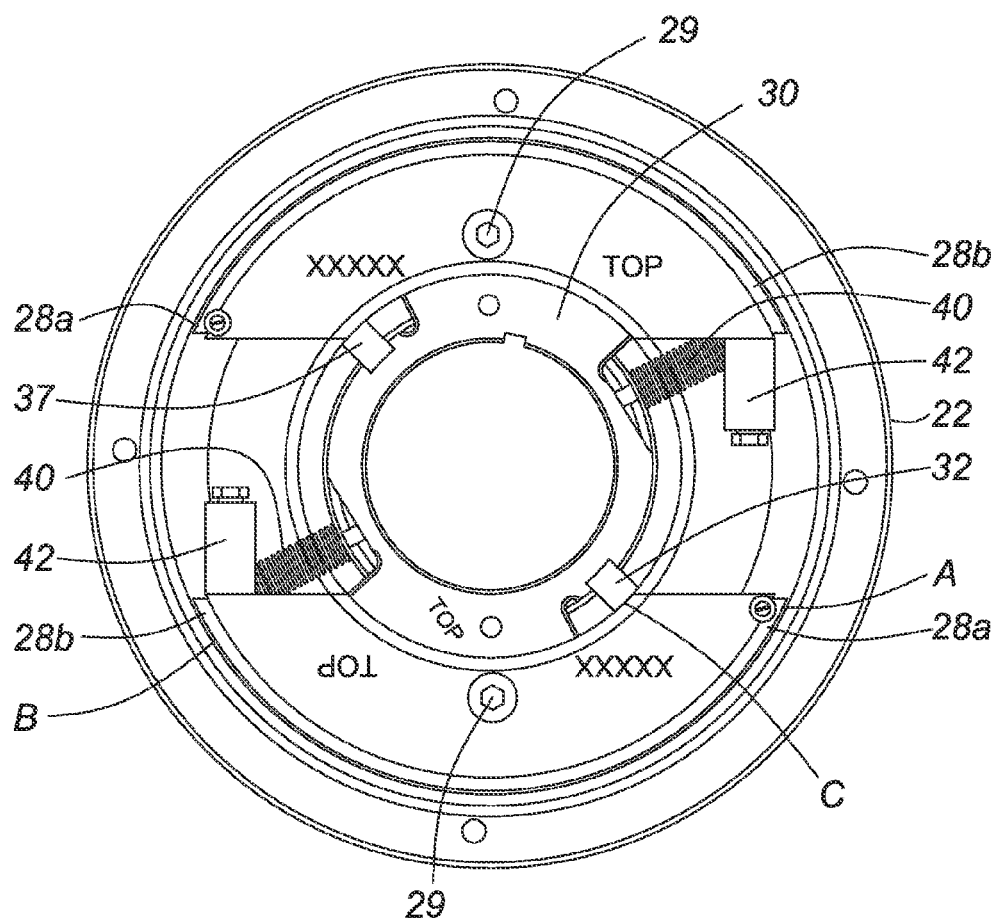
FIG. 8 is a top view of the brake of FIG. 3 during forward fast rotation.
Figure 9:
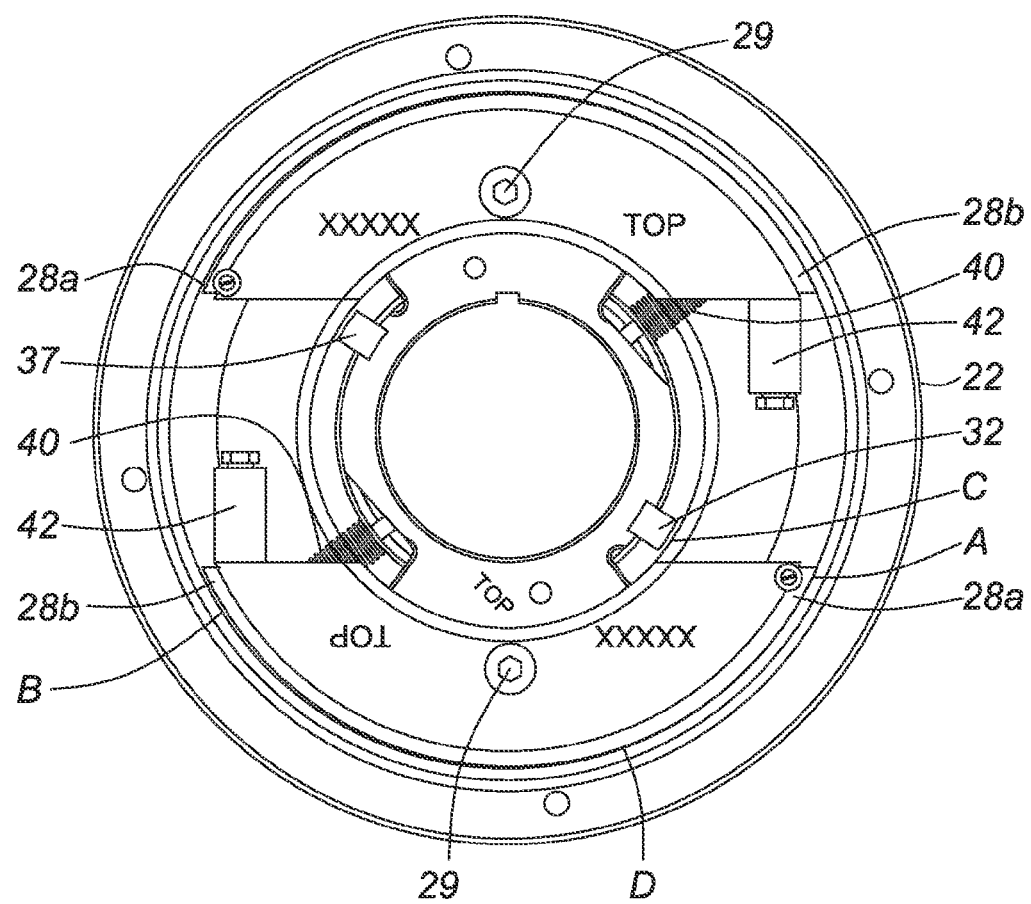
FIG. 9 is a top view of the brake of FIG. 3 during backward slow rotation.
Figure 10:
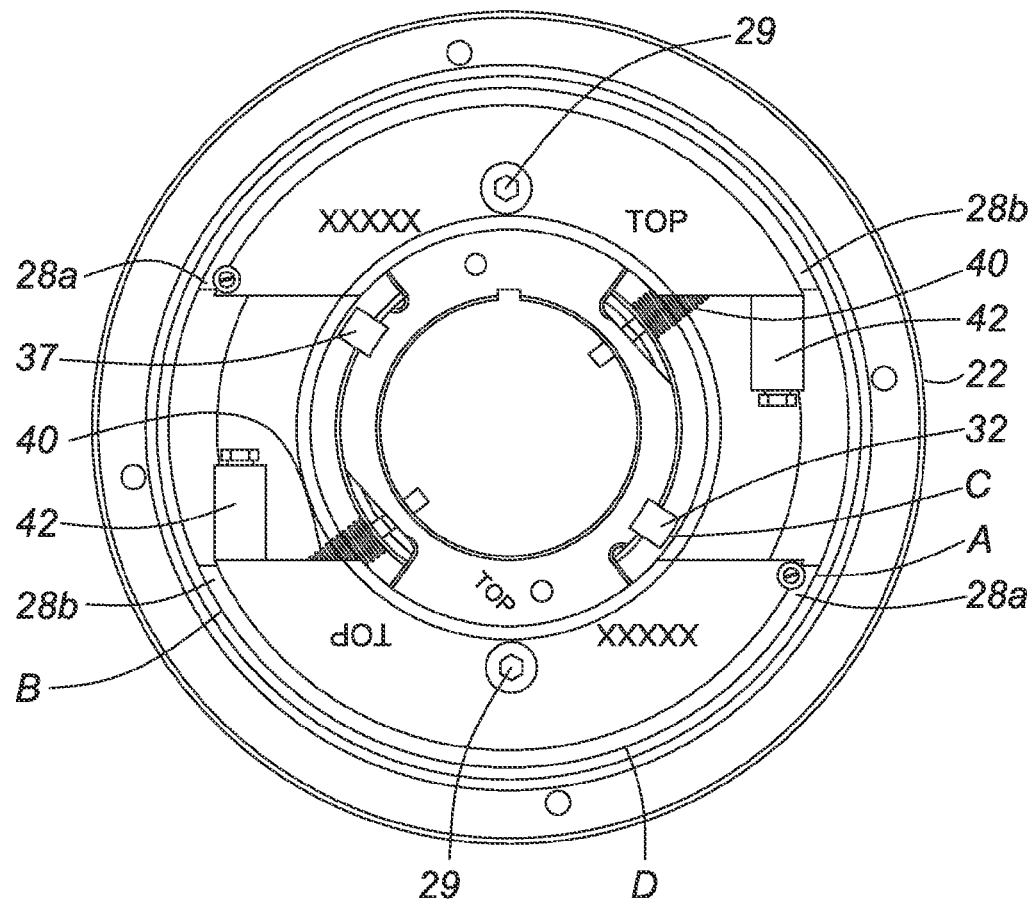
FIG. 10 is a top view of the brake of FIG. 3 during backward fast rotation.

The connection between the brake hub 30 and each brake shoe 28 for transfer of the braking force generated by the selective braking engagement to the brake hub 30 and the output shaft 109 is achieved with a pivot pin 29 extending through the brake shoe 28 and through a pin slot 32 provided in the brake hub 30 (see FIG. 3, 3a). This arrangement allows the brake shoes 28 to pivot about the pivot pin 29. The selective braking engagement is achieved by movement of the pivot pin 29 in the pin slot 32 as will be described below in reference to the further Figures.

As will be apparent from FIGS. 3 to 6, the backspin brake arrangement 20 in accordance with the invention includes the brake drum 22, a brake hub 30 for fastening to a shaft to be retarded upon backspin (not shown), and at least a pair of brake shoes 28, each brake shoe 28 mounted on the brake hub 30 by way of an integrated pivot pin 29 extending through a pin slot 32 in the brake hub 30. The pivot pin 29 extends through a bore 27 in the brake shoe 28 oriented parallel to the axis of rotation 31 of the brake hub 30 (see FIG. 4a) and is either screwed into the bore 27 or held in the bore 27 by a set screw (not shown). Moreover, the pivot pin 29 is movable in the pin slot 32 between deactivated and activated positions 29a, 29b (see FIGS. 5 and 6) and the pin slot 29 is shaped for radial displacement of the brake shoe 28 relative to the hub 30 between a radially inward, disengaged position when the pivot pin 29 is in the deactivated position 29a (see FIG. 5) and a radially outward, engaged position, wherein the brake shoe 28 is in braking engagement with the brake drum 22, when the pivot pin 29 is in the activated position 29b (see FIG. 6). Movement of the pivot pin 29 in the pin slot 32 between the deactivated and activated positions 29a, 29b is achieved by shifting the brake shoes 28 relative to the brake hub 30.

Shifting of the brake shoes 28 relative to the brake hub 30 is achieved by selectively creating frictional drag between the brake shoes 28 and the brake drum 22 at low speeds, in either forward or backward spin direction. The frictional drag is created as follows. Each brake shoe 28 has first and second ends 28a, 28b, located on opposite sides of the pivot pin 29 and is therefore pivotable about the pivot pin 29.

For each brake shoe 28, a biasing structure, in the illustrated embodiment a tension spring 40 is mounted between the brake hub 30 and the second end 28b of the brake shoe 28 to pivot the brake shoe 28 about the pivot pin 29 and bias the first end 28a of the brake shoe into engagement with the brake drum 22 (see FIGS. 7-10). This creates friction between the brake shoe 28 and the drum 22. Upon startup of forward or backward rotation of the brake hub, this friction creates frictional drag on the brake shoes, which means the brake shoes initially remain stationary in the brake drum 22, while the brake hub 30 starts to rotate with the shaft. The resulting shift of the brake hub 30 relative to the brake shoes 28 causes the pivot pins 29 to move along the pin slots 32 until each pivot pin 29 engages an end of the pin slot 32 either in the deactivated position 29a at the start of forward rotation, or in the activated position 29b at the start of backspin rotation.

It is apparent, that the desired frictional drag and shifting of the hub 30 relative to the brake shoes 28 can also be achieved by mounting the pivot pins 29 on the hub 30 and providing the pin slot 32 in the brake shoes.

In a preferred embodiment, the backspin brake further includes a counterbiasing structure for counteracting, at elevated forward rotation speeds of the shaft 109, the biasing of the first end 28a of the brake shoe 28 and causing a pivoting of the first end 28a away from the brake drum 22. When the biasing structure is a spring 40, the counterbiasing structure is preferably a counterweight 42 bolted to the brake shoe 28. Most preferably, the counterweight is bolted to the second end 28b when the spring 40 is a compression spring (not shown) and to the first end 28a when the spring 40 is a tension spring (see FIGS. 3-6). Although compression springs can principally be used, they require the inclusion of additional parts into the brake system and tension springs are the preferred biasing structure.

In the preferred embodiment, the pin slot 32 is shaped as a curved slot with a radius of curvature parallel to the wall 24 of the brake drum 22 and at the activated end 32b has a radially outward extending enlargement 35 for receiving the pivot pin 29. Preferably, the pin slot 32 is positioned to maintain the brake shoe 28 at a selected spacing from the brake drum 22 when the pivot pin 29 is in the deactivated position and the enlargement 35 has a radial depth at least equal to the selected spacing.

In another preferred embodiment, the backspin brake system includes a backstop 37 on the brake hub for each brake shoe 28 for limiting the pivoting of the first end 28a away from the brake drum in order to prevent engagement of the second end 28b with brake drum 22 when the pivot pin is in the deactivated position 29a. The backstop 37 can also be provided on the brake shoe 28 for engagement with a circumferential shoulder of the brake hub 30. In the preferred embodiment, the backstop 37 is a separately machined part which is installed on the hub 30, one backstop 37 being provided for each brake shoe 28 and the backstops being circumferentially evenly distributed about the axis of rotation of the hub, for rotational balancing.

OPERATION

The operation of a preferred embodiment of the backspin brake of the invention as illustrated in the drawings will now be discussed in detail with reference to FIGS. 7-10. On startup of the PCP installation (see FIG. 7), the frictional drag created between the brake shoes 28 and the brake drum 30 at the first end 28a of the brake shoes 28 causes the brake hub 30 to commence rotation with the shaft 109, while the brake shoes are still stationary in the brake drum, causing a shifting of the brake hub 30 relative to the brake shoes 28 until the pivot pin 29 reaches the deactivated position 29a in the pin slot 32. At that position of the pivot pin 29, full engagement of the brake shoes 28 with the brake drum is prevented, the first end 28a of each brake shoe is in frictional engagement with the brake drum 22 at A, the second end 28b is spaced from the brake drum 22 at B and the brake shoe 28 is spaced from the backstop 37 at C.

As the forward spin speed increases (see FIG. 8), the counterweight 42 is pushed radially outward by the centrifugal force, which leads to pivoting of the brake shoe 28 about pivot pin 29 until the first end 28a of the brake shoe 28 comes to rest against the backstop 37 at C. At that point, neither of the first and second ends 28a, 28b of the brake shoes 28 engage the brake drum 22 and both are spaced from the drum at A and B, so that forward rotation of the shaft 109 is not at all impeded by the backspin brake.

Once power to the prime mover 102 is interrupted, the forward spin of the shaft 109 decreases rapidly and the direction of rotation of the shaft 109 eventually reverses. As the forward speed approaches zero, the biasing force of the spring 40 exceeds the centrifugal force acting on the counterweight 42 and the first end 28a of the brake shoes 28 once again engages the brake drum 22 (see FIG. 9). The resulting frictional drag on the brake shoes 28 causes the brake hub 30 to shift relative to the brake shoes 28 upon reversal of the rotation and startup of the backspin rotation, thereby causing the pivot pins 29 to move from the deactivated position 29a in the pin slot 32 to the activated position 29b at the opposite end of the pin slot 32 (see FIGS. 5 and 6). In the activated position, the pivot pins 29 can move into the enlargement 37, the first end 28a of each brake shoe 28 is in frictional engagement with the brake drum 22 at A, the second end 28b is spaced from the brake drum 22 at B and the brake shoe 28 is spaced from the backstop 37 at C.

As the backspin speed builds (see FIG. 10), the centrifugal force acting on the brake shoes 28 increases and forces the pivot pins 29 into the enlargement 37 and the brake pads into complete engagement with the brake drum 22. The resulting friction between the brake pads 28 and the braking surface 25 of the brake drum 22 converts the stored torsional energy into heat to brake the backspin of the shaft 109. As rotation of the shaft 109 is slowed by the braking action, the centrifugal force on the brake shoes 28 reduces correspondingly and the braking force decreases, so that the braking force is automatically controlled by the rotational speed of the shaft 109 and the brake shoes 28. This automatic control of the braking force means that the shaft 109 is free to continue backspinning until all reactive torque stored in the sucker rod string 110 is dissipated.

Braking ceases when the backspin speed subsides below the point where the force of the biasing spring 40 exceeds the centrifugal force acting on the associated second end 28b of the brake shoe 28. This ensures that no reactive torque is locked in the drive train, and constitutes an important safety feature of the invention. The re-engagement of the first end 28a of the brake shoes 28 when the backspinning shaft 109 approaches standstill also ensures that upon reenergizing of the prime mover the backspin brake is switched back to the deactivated condition (see FIG. 7).

It will be readily understood by those skilled in the art that changes and modifications to the above-described embodiments may be made without departing from the scope of the invention. The scope of the invention is therefore intended to be limited solely by the scope of the appended claims.

What is claimed is:

1. A centrifugal brake system for retarding backspin of a shaft comprising:
   a brake drum for mounting in a stationary supporting structure concentrical with the shaft;
   a brake hub attachable to the shaft for co-rotation with the shaft concentrically in the brake housing;
   two or more brake shoes distributed circumferentially about the hub and mounted on the hub for selective braking engagement with the brake drum;
   a mechanical linkage for transferring braking force generated by the braking engagement from each of the brake shoes to the hub and for radial displacement of the brake shoes relative to the hub, upon rotational shifting of the hub relative to the brake shoes, between a radially inward, disengaged position, wherein the brake shoes are not in braking engagement with the brake drum and a radially outward, engaged position, wherein the brake shoes are in braking engagement with the brake drum; and means for generating a frictional drag between the brake shoes and the brake drum to cause the rotational shifting of the brake hub relative to the brake shoes to the deactivated position during forward rotation and to the activated position during backward rotation wherein each brake shoe has first and second ends located on opposite sides of the respective mechanical linkage and wherein each brake shoe is pivotable about the mechanical linkage, and the means for generating a frictional drag is a biasing means connected to each brake shoe for pivoting the brake shoe about the mechanical linkage and biasing the first end of the brake shoe against the brake housing for generating a friction force between the brake shoe and the brake drum.

2. The centrifugal brake system of claim 1, wherein each mechanical linkage is a pivot pin positioned in each brake shoe for transferring braking force generated by the braking engagement from the brake shoes to the hub; and a pin slot in the brake hub for each brake shoe for receiving the pivot pin, the pivot pin being movable in the pin slot between deactivated and activated positions by rotational shifting of the brake hub relative to the brake shoes and the pin slot being shaped for radial displacement of the brake shoe relative to the hub between the disengaged and engaged positions.

3. The centrifugal brake system of claim 2, wherein the friction force between the brake shoe and the brake drum causes the brake hub to shift relative to the brake shoes thereby causing the pivot pin to move in the pin slot into the deactivated position upon rotation of the shaft in a forward direction and into the activated position upon rotation of the shaft in a backwards direction.

4. The centrifugal brake system of claim 3, wherein the biasing means is a spring mounted between the hub and the brake shoe.

5. The centrifugal brake system of claim 4, wherein the spring is a compression spring connected to the brake shoe at the first end, or a tension spring connected to the brake shoe at the second end.

6. The centrifugal brake system of claim 3, further comprising a counterbiasing means for counteracting, at elevated forward rotation speeds of the shaft, the biasing of the first end of the brake shoe and for pivoting the first end away from the brake drum.

7. The centrifugal brake system of claim 6, wherein the counterbiasing means is a counterbalancing mass attached to the brake shoe.

8. The centrifugal brake system of claim 5, further comprising a counterbiasing means for generating a counter biasing force counteracting, at elevated forward rotation speeds of the shaft, the biasing of the first end of the brake shoe to pivot the first end away from the brake drum.

9. The centrifugal brake system of claim 8, wherein the counterbalancing means is a counterbalancing mass connected to the second end when the spring is a compression spring and to the first end when the spring is a tension spring.

10. The centrifugal brake system of claim 2, wherein the pin slot is shaped as a curved slot with a radius of curvature parallel to a wall of the brake drum and at the second end has a radially outward enlargement for receiving the pivot pin.

11. The centrifugal brake system of claim 10, wherein the pin slot is shaped to maintain the brake shoe at a preselected spacing from the brake drum when the pivot pin is in the first position and the enlargement has a radial depth at least equal to that spacing.

12. The centrifugal brake system of claim 6, further comprising a back stop for each brake shoe for limiting the pivoting of the first end away from the brake drum to prevent engagement of the second end with brake drum when the pivot pin is in the first position.

13. The centrifugal brake system of claim 8, further comprising a stop for each brake shoe for limiting the pivoting of the first end away from the brake drum to prevent engagement of the second end with brake drum when the pivot pin is in the first position.

14. The centrifugal brake system of claim 12, wherein the stop is a tab mounted to the brake shoe for engagement with a shoulder on the hub.

15. The centrifugal brake system of claim 13, wherein the stop is a tab mounted to the brake shoe for engagement with a shoulder on the hub.

16. A method for retarding backspin of a rotatable shaft in a brake system having a stationary brake drum concentrical with the shaft, a hub mounted on the shaft for co-rotation with the shaft in the brake drum and two or more brake shoes distributed circumferentially about the hub and pivotally mounted on the hub, the method comprising the steps of:
pivoting each brake shoe on the hub for biasing an end of the brake shoe against the brake drum for generating a friction force between the brake shoe and the brake drum; and
using the friction force for moving the brake shoes relative to the hub between a radially inward, disengaged position wherein the brake shoe is not in braking engagement with the brake housing, and a radially outward, engaged position wherein the brake shoe is in braking engagement with the brake drum.

17. The method of claim 16, comprising the further step of creating a counterbalancing force for pivoting the end of the brake shoe away from the brake housing at elevated forward rotation speeds of the shaft.

18. The method of claim 17, comprising the further step of limiting the pivoting of the first end away from the brake drum to prevent engagement of the second end with brake drum when the brake shoe is in the disengaged position.

* * * * *